United States Patent Office 3,050,545
Patented Aug. 21, 1962

3,050,545
3-(HALOPHENYLTHIO)ALKENENITRILES
Samuel Allen Heininger, Warson Woods, Mo., and Gail H. Birum, Dayton, Ohio, assignors to Monsanto Chemical Company, St. Louis, Mo., a corporation of Delaware
No Drawing. Filed Dec. 23, 1959, Ser. No. 861,454
8 Claims. (Cl. 260—465)

This invention relates to new and useful 3-(halophenylthio)alkenenitriles.

The novel compounds of the invention are 3-(halophenylthio)alkenenitriles having the formula,

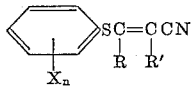

wherein R and R' are hydrogen or hydrocarbon radicals free of aliphatic unsaturation and contain from 1 to 6 carbon atoms, provided that at least one of R and R' is hydrogen. The term "free of aliphatic unsaturation" includes aryl, alkyl and cycloalkyl radicals only, and by the term "free of aliphatic unsaturation" olefinic and acetylenic unsaturation are excluded. X is a halogen, preferably, chlorine or bromine, and $n$ is an integer from 1 to 5 inclusive. An examination of the formula above will indicate that the compounds can exist in both the cis- and trans-isomeric forms. It is intended that both the cis- and trans-forms be covered by the above formula.

It is an object of this invention to provide new and useful compositions of matter.

It is another object of this invention to provide new compounds useful as intermediates for the production of other compounds.

It is another object of this invention to provide new compounds useful as active ingredients in biological toxicant compositions.

These and other objects of the invention will become apparent as a detailed description of the invention proceeds.

There are shown below a number of the specific new compounds of the invention. It is not intended that this be a complete listing of all the compounds of the invention but that it merely be illustrative thereof. The following are a listing of a number of the 3-(chlorophenylthio)-alkenenitriles:

3-(4-chlorophenylthio)acrylonitrile,
3-(2-chlorophenylthio)acrylonitrile,
3-(3-chlorophenylthio)acrylonitrile,
3-(2,3-dichlorophenylthio)acrylonitrile,
3-(2-4-dichlorophenylthio)acrylonitrile,
3-(2,5-dichlorophenylthio)acrylonitrile,
3-(2,6-dichlorophenylthio)acrylonitrile,
3-(3,4-dichlorophenylthio)acrylonitrile,
3-(3,5-dichlorophenylthio)acrylonitrile,
3-(2,3,4-trichlorophenylthio)acrylonitrile,
3-(2,3,5-trichlorophenylthio)acrylonitrile,
3-(2,3,6-trichlorophenylthio)acrylonitrile,
3-(2,4,5-trichlorophenylthio)acrylonitrile,
3-(2,4,6-trichlorophenylthio)acrylonitrile,
3-(3,4,5-trichlorophenylthio)acrylonitrile,
3-(2,3,4,5-tetrachlorophenylthio)acrylonitrile,
3-(2,3,4,6-tetrachlorophenylthio)acrylonitrile,
3-(2,3,5,6-tetrachlorophenylthio)acrylonitrile and
3-(pentachlorophenylthio)acrylonitrile, etc.

The following is a non-limiting listing of a number of the new 3-(bromophenylthio)acrylonitriles:

3-(2-bromophenylthio)acrylonitrile,
3-(3-bromophenylthio)acrylonitrile,
3-(4-bromophenylthio)acrylonitrile,
3-(2,4-dibromophenylthio)acrylonitrile,
3-(pentabromophenylthio)acrylonitrile, etc.

Some of the novel compounds of the invention of the 3-(iodophenylthio)acrylonitrile type are shown in the following non-limiting list:

3-(2-iodophenylthio)acrylonitrile,
3-(3-iodophenylthio)acrylonitrile,
3-(4-iodophenylthio)acrylonitrile,
3-(2,5-diiodophenylthio)acrylonitrile,
3-(pentaiodophenylthio)acrylonitrile, etc.

For a non-limiting list of the 3-(fluorophenylthio)-acrylonitriles the following are named:

3-(4-fluorophenylthio)acrylonitrile,
3-(3-fluorophenylthio)acrylonitrile,
3-(2-fluorophenylthio)acrylonitrile,
3-(2,4,6-trifluorophenylthio)acrylonitrile,
3-(pentafluorophenylthio)acrylonitrile, etc.

It is also intended to cover under the general formula compounds containing a mixture of halo substituents and the following are a non-limiting list thereof:

3-(2-bromo-4-chlorophenylthio)acrylonitrile,
3-(2,4-dibromo-3-chlorophenylthio)acrylonitrile,
3-(2-fluoro-3-iodo-4-chlorophenylthio)acrylonitrile, etc.

Referring now to the general formula above of the inventive compounds where R and R' are other than hydrogen, the following non-limiting list exemplary of compounds in which R and R' may be methyl, ethyl, phenyl, etc. is provided:

3-(4-chlorophenylthio)crotononitrile,
3-(4-chlorophenylthio)cinnamonitrile,
3-(2,4,5-trichlorophenylthio)-2-ethylacrylonitrile,
3-(pentachlorophenylthio)-2-methacrylonitrile,
3-(4-chlorophenylthio)-2-cyclohexylacrylonitrile,
3-(4-chlorophenylthio)-2-methacrylonitrile, etc.

The novel compounds of the invention are normally prepared by dehydrohalogenation of the corresponding 3-(halophenylthio)haloalkanenitrile, and these intermediate compounds are described and the preparation thereof in copending application Serial No. 641,477, filed February 21, 1957, now U.S. 2,919,225. The dehydrohalogenation is accomplished by the employment of basically acting materials such as triethylamine, sodium or potassium hydroxide, pyridine, etc., to aid the dehydrohalogenation; however, preferred dehydrohalogenation agents are the lower trialkylamines, such as triethylamine. The 3-(halophenylthio)-2-haloalkanenitrile intermediate products can be prepared by a variety of methods including the addition of halobenzenesulfenyl chlorides or bromides to acrylonitrile or similar unsaturated nitriles; however, this method usually results in the production of a mixture of isomers having both 3- or 2-halo-2- or 3-(halophenylthio)-propionitriles or analogous compounds, and it will be difficult to separate the desired 3-(halophenylthio)acrylonitriles therefrom. Another method of preparation of these intermediate compounds is by the addition of halogenated thiophenols to, e.g., α-haloacrylonitrile. Yet a further method of preparing these intermediate products is by the reaction of sodium or potassium halogen-substituted thiophenates with 2,3-dichloropropionitrile or similar nitriles.

The invention will be more clearly understood from the following detailed description of specific examples thereof.

*Example 1*

This is an example of the preparation of 3-(4-chlorophenylthio)acrylonitrile isomers.

In a two-liter flask was placed 289 grams (2.0 moles) of p-chlorothiophenol, and a solution of 80 grams (2 moles) of NaOH in 800 ml. of water was added while cooling the flask in an ice bath. Then over a period of two hours 247.5 grams (2 moles) of 2,3-dichloropropionitrile was added, keeping the temperature at 15°–20° C. by cooling. The reaction mixture was stirred for one hour longer and then allowed to stand overnight. The product had solidified to small pellets. These pellets were filtered from the reaction mixture and were recrystallized from three liters of ethanol as fine white needles which melted at 42°–43° C. A total of 203 grams was recovered in the first crop of crystals. The filtrate was concentrated and diluted with water with the result that a second crop of 128 grams of crystals were recovered, M.P. 40°–41° C. Retreating of the filtrate gave a third crop of 32 grams of crystals. The total yield of product was therefore 363 grams, 78.3% yield. Considerable additional material remained in the mother liquor. Had the material been distilled, the yield would undoubtedly have been appreciably higher. The purified crystalline product had the following elemental analysis:

| Percent | Found | Calc'd for $C_9H_7Cl_2NS$ |
|---|---|---|
| C | 47.2 | 46.6 |
| H | 2.9 | 3.0 |
| N | 5.7 | 6.0 |
| Cl | 30.4 | 30.5 |
| S | 14.1 | 13.8 |

This describes the dehydrochlorination of the product whose preparation is described in the paragraph immediately above. In a beaker there was placed 23.1 grams (0.1 mole) of 3-(4-chlorophenylthio)-2-chloropropionitrile prepared as described above. To the beaker was added 100 ml. of ether to dissolve the solid product therein, and 20.2 grams of triethylamine was added. At first no precipitate formed even after heating on a steam bath and concentrating until all the ether was driven off. An additional 10 ml. of triethylamine was added, and a solid precipitate formed. Ether was added to the contents of the beaker. The slurry was filtered to remove the solid matter and again the ether was evaporated from the filtrate. To the filtrate an additional 10 ml. of triethylamine was added giving a solid precipitate, and the filtering, washing and filtrate concentration steps were repeated. In this fashion in five separate treatments 11.0 grams of triethylamine hydrochloride were recovered which is 80% of theory. The dark red ether filtrate from the last treatment was poured into 500 ml. of hexane and heated to boiling to drive out the ether. Then sodium sulfate and charcoal were added and the mixture heated for a few minutes on the steam bath. The mixture was then filtered through "Supercel" to give a clear, light yellow hexane solution. This solution was seeded with a small amount of the desired product and allowed to cool to room temperature, giving 1.1 grams of white needles having a melting point of 101°–102° C. as a first crop of crystals. The filtrate was warmed again to give complete solution and the same procedure repeated on the filtrate except that the filtrate was cooled in a water bath. The result was 1.5 grams of crystals having a melting point of 93°–95° C. A similar retreatment of the filtrate gave a third crop of 2.1 grams of crystals having a melting point of 93°–96° C. A fourth crop of crystals was recovered in an amount of 7.2 grams, M.P. 68°–69° C. There still was a residue which did not crystallize but oiled out of the filtrate. The solvent was evaporated from the filtrate and Skellysolve was used instead of hexane. From this treatment of the filtrate an additional 4.4 grams of yellow crystalline solid was recovered, and a black tarry residue remained after evaporating a solvent. The first two crops of crystals were combined since they contained most of the high melting crystalline material to give a total of 2.6 grams of this product. The last three crops of crystals were combined to give 13.7 grams of low melting point product. The total recovery was 83.3% or a yield of 13.3% of the high melting point product and 70% of the lower melting point product. Figured on the ratio of crystalline product isolated, this is 16% high melting point product and 84% low melting point product. Before the fourth crop of crystals was combined with the third and fifth crops, a sample was taken of this fourth crop and recrystallized from Skellysolve to give a pure crystalline material, M.P. 68°–69° C. This pure lower melting point product had the following elemental analysis:

| Percent | Found | Calc'd for $C_9H_6ClNS$ |
|---|---|---|
| C | 54.91 | 55.25 |
| H | 4.38 | 3.09 |
| N | 7.19 | 7.16 |
| Cl | 17.03 | 18.15 |
| S | 15.99 | 16.35 |

Contrary to conventional beliefs wherein the lower melting isomer is usually believed to be the cis-isomer, it is believed that this lower-melting isomer is in fact the trans-isomer. Although certain experimental evidence points in this direction, we have indicated we do not wish to be bound by this hypothesis.

If instead of p-chlorothiophenol either o-chlorothiophenol or m-chlorothiophenol are used in the same molar amount in the reaction of Example 1, the corresponding 3-(2-chlorophenylthio)-2-chloropropionitrile and 3-(3-chlorophenylthio)-2-chloropropionitrile intermediate products respectively are obtained. These ortho- and meta-intermediate products are then dehydrochlorinated in the same manner as the para-substituted isomer of Example 1 to produce the corresponding 3-(2-chlorophenylthio)acrylonitrile and 3-(3-chlorophenylthio)acrylonitrile, respectively.

*Example 2*

This example illustrates a preparation of 3-(4-chlorophenylthio)acrylonitrile similar to Example 1.

In a beaker 20 grams of NaOh was placed and 200 ml. of water was added. After most of the sodium hydroxide had dissolved 72 g. (0.5 mole) of p-chlorothiophenol was added. Not all of this thiophenol went into solution so a few more pellets of sodium hydroxide were added, and the mixture was filtered. The cloudy filtrate was then added gradually over one hour to a well-stirred mixture of 62 g. (0.5 mole) of 2,3-dichloropropionitrile dissolved in 300 ml. of water. The reaction was mildly exothermic and the temperature was kept below 35° C. with cooling. The organic layer which separated was taken up in ether, water washed and dried over sodium sulfate. The solvent was evaporated and the residue distilled. Some decomposition occurred at the beginning of the distillation but soon stopped, and the distillation continued smoothly. First there were collected a few ml. of forerun, then 92 g. (79.5%) of a clear, light yellow product, $n_D^{25}$ 1.5898, B.P. 144–146° C./0.4 mm., was collected. Infrared testing of this product gives only slight nitrile band absorption indicating primarily 3-(4-chlorophenylthio)-2-chloropropionitrile. Further conformation of this structure was indicated by oxidation to the sulfone and comparison by mixed melting point with this sulfone made in another manner. Also the refractive index is fairly close to that of the pure α-chloro isomer. The following is an elemental analysis of the product:

| Percent | Found | Calc'd for $C_9H_7Cl_2NS$ |
|---|---|---|
| C | 47.29 | 46.6 |
| H | 3.17 | 3.04 |
| Cl | 28.13 | 30.5 |
| N | 5.84 | 6.03 |
| S | 14.18 | 13.8 |

In a beaker was placed 23.2 g. (0.1 mole) of the 3-(4-chlorophenylthio)-2-chloropropionitrile prepared as described immediately above, and this was dissolved in 200 ml. of ether. To the beaker was then added 10 g. of triethylamine. The solution became cloudy and a solid began to precipitate. The beaker was then placed on a steam bath and heated to expel the ether. The product was filtered to remove the amine salt and a dark brown oil filtrate remained. To obtain more material, the above reactions were repeated using the same quantity of reactants. Again on the addition of the triethylamine, solid precipitated in the reaction mixture. The reaction mixture was filtered to remove the amine salt and heated on a steam bath. Additional ether was added and the reaction mixture again filtered. Two ml. of triethylamine was added and heated again to drive off all the ether. The solidified reaction mixture was diluted again with ether and filtered to remove the amine salt. After 4 such cycles, collecting a total of 8.6 g. of the amine hydrochloride, the filtrate was heated on a steam bath to remove the ether, then allowed to cool, resulting in the solidification of the residue. The solid was dissolved in boiling hexane leaving behind the red tar on decantation. The hexane solution was decolorized with "Norit" charcoal, cooled slowly, and yellowish-green needles crystallized out from the hexane solution. The dried crystals had a melting point of 63°–95° C., and were obviously a mixture of two materials. The total yield of crystals was 10.0 grams. Recrystallization of the crystalline material gave 2.0 g. of needle-like crystals having a melting point of 101°–102° C., and the following elemental analysis:

| Percent | Found | Calc'd for $C_9H_6ClNS$ |
| --- | --- | --- |
| C | 55.38 | 55.25 |
| H | 3.11 | 3.09 |
| N | 7.06 | 7.16 |
| Cl | 17.92 | 18.15 |
| S | 16.42 | 16.35 |

Clearly, this is the higher melting point isomer believed to be the cis-isomer having the general structure 3-(4-chlorophenylthio)acrylonitrile.

The mother liquor from which the above product was crystallized was then retreated by concentration, and 2.4 g. of yellow needles crystallizing in a clump, M.P. 67°–69° C., were recovered. This material was recrystallized from hexane, giving slightly off-white colored clumps of crystals, M.P. 68°–69° C. This is believed to be the lower melting or the trans-isomer. A sample of this 68°–69° C. material was submitted for elemental analysis and gave the following results:

| Percent | Found | Calc'd for $C_9H_6ClNS$ |
| --- | --- | --- |
| C | 55.71 | 55.25 |
| H | 3.19 | 3.09 |
| Cl | 18.87 | 18.15 |
| N | 6.77 | 7.16 |
| S | 16.42 | 16.35 |

The filtrates were combined and retreated to give an additional 6.4 g. of yellow-white crystals, M.P. 40°–70° C., obviously a crude mixture. Infrared reports of both the 68°–69° C. and the 101°–102° C. isomers have very similar curves, both showing 2220 wave length conjugated nitrile bands. The generally accepted theory assigns the trans-isomer structure to the higher melting, least soluble isomer. However, as pointed out above, there is other evidence available which indicates in this case that the lower melting isomer, namely the 68°–69° C. isomer is the trans-isomer, and the 101°–102° C. isomer is the cis-isomer. However, as already indicated it has not been conclusively established that this is true, and the isomers will be claimed by melting point when trying to distinguish them.

*Example 3*

This example illustrates the preparation of a mixture of isomers of 3-(4-chlorophenylthio)acrylonitrile and 2-(4-chlorophenylthio)acrylonitrile.

The propionitrile intermediate product is made in the following manner: A mixture of 35.8 grams (0.2 mole) of p-chlorobenzenesulfenyl chloride and 10.6 g. (0.2 mole) of acrylonitrile in 100 ml. of glacial acetic acid was refluxed for two hours. The color of the mixture turned from red to yellow in the first 15 minutes of reflux. Some HCl evolution will normally be observed in carrying out this reaction. After standing overnight at room temperature the reaction mixture was poured into 500 ml. of water to give a cloudy, viscous, orange oil. The oil was extracted with a mixture of equal volumes of benzene and hexane and the extract was washed with water until it was free of acid, and then the orange solution was distilled. After removal of the solvent, there was obtained 28.7 g. of yellow viscous product, $n_D^{25}$ 1.5914, B.P. 180°–190° C./15 mm.

This describes the dehydrochlorination of the product whose preparation is described in the paragraph immediately above. In a breaker there is placed 23.1 g. (0.1 mole) of 3-(4-chlorophenylthio)-2-chloropropionitrile and 2-(4-chlorophenylthio)-3-chloropropionitrile mixture of isomers prepared as described above. To the breaker is added 100 ml. of ether to dissolve the solid product therein, and 20.2 g. of triethylamine is added. The reaction mixture is heated on a steam bath to facilitate the dehydrochlorination. If any prepiciptate forms, it is removed by filtration. After the removal of the precipitate the ether is driven from the filtrate by heating on a steam bath. Then an additional amount of 10 ml. of triethylamine is added to the filtrate from which the ether has been removed, a solid precipitate forms, and ether is added to dilute the mixture for filtration. The precipitate slurry is filtered to remove the solid matter and again the ether is evaporated from the filtrate. The method of adding the 10 ml. of triethylamine, heating on steam bath to facilitate precipitate formation, adding ether to facilitate filtration, removing the precipitate by filtration and removing the ether from the filtrate is repeated four more times to substantially completely dehydrochlorinate the 3-(4-chlorophenylthio)-2-chloropropionitrile. The filtrate from the last filtration is then poured into 500 ml. of hexane and heated to boiling to drive out the ether. Then sodium sulfate and charcoal are added and the mixture is heated for a few minutes on the steam bath. This mixture is then filtered through "Supercel" to give a decolorized hexane solution. The decolorized clear hexane solution containing the desired product is then treated in a manner similar to that described in Example 1 to recover the desired product in crystalline form or, alternatively, the product can be purified by distillation under vacuum after evaporating the hexane. A relatively impure product, of course, can be obtained by merely evaporating the hexane. It is difficult to separate the 3-(4-chlorophenylthio)acrylonitrile and 2-(4-chlorophenylthio)acrylonitrile isomers by either crystallization or distillation, so the desired 3-(4-chlorophenylthio)acrylonitrile product may be recovered in a relatively impure form when made by the method of this example.

In a similar manner to that described in Example 3, if rather than p-chlorobenzenesulfenyl chloride there is used an equal molar amount of o-chlorobenzenesulfenyl chloride, m-chlorobenzenesulfenyl chloride or pentachlorobenzenesulfenyl chloride there is obtained the corresponding 3-(2-chlorophenylthio)acrylonitrile and 2-(2-chlorophenylthio)acrylonitrile, 3 - (3 - chlorophenylthio) - acrylonitrile and 2-(3-chlorophenylthio)acrylonitrile, or 3-(pentachlorophenylthio)acrylonitrile and 2-(pentachlorophenylthio)acrylonitrile mixed isomers, respectively.

*Example 4*

This example described the preparation of 3-(4-bromophenylthio)acrylonitrile.

In a 2-liter flask is placed 375 grams (2.0 moles) of p-bromothiophenol, and a solution of 80 grams (2 moles) of NaOH in 800 ml. of water is added while cooling the flask in an ice bath. Then over a period of 2 hours, 247.5 g. (2 moles) of 2,3-dichloropropionitrile is added, keeping the temperature at 10°–20° C. by cooling. The reaction mixture is stirred for 1 hour longer and then allowed to stand overnight. The intermediate product 3-(4-bromophenylthio)-2-chloropropionitrile is then separated from the reaction mixture and purified by crystallization in a similar manner as in Example 1 or alternatively by distillation.

This describes the dehydrochlorination of the product whose preparation is described in the paragraph immediately above. In a beaker there is placed 27.6 g. (0.1 mole) of 3-(4-bromophenylthio)-2-chloropropionitrile prepared as described above. To the beaker is added 100 ml. of ether to dissolve the solid product therein, and 20.2 g. of triethylamine is added. The reaction mixture is heated on a steam bath to facilitate the dehydrochlorination. If any precipitate forms, it is removed by filtration. After the removal of the precipitate, the ether is driven from the filtrate by heating on a steam bath. Then an additional amount of 10 ml. of triethylamine is added to the filtrate from which the ether has been removed, heating on a steam bath is used if necessary to facilitate precipitate formation, and ether is added to dilute the mixture for filtration. The precipitate slurry is filtered to remove the solid matter and again the ether is evaporated from the filtrate. The method of adding the 10 ml. of triethylamine causing a precipitate, adding the ether to facilitate filtration, removing the precipitate by filtration and removing the ether from the filtrate is repeated four more times to substantially completely dehydrochlorinate the 3-(4-bromophenylthio)-2-chloropropionitrile. The filtrate from the last filtration is then poured into 500 ml. of hexane and heated to boiling to drive out the ether. Then sodium sulfate and charcoal are added and the mixture is heated for a few minutes on the steam bath. This mixture is then filtered through "Supercel" to give a decolorized hexane solution. The decolorized clear hexane solution containing the desired product is then treated in a manner similar to that described in Example 1 to recover the desired product in crystalline form or alternatively the product can be purified by distillation under vacuum after evaporating the hexane. A relatively impure product, of course, can be obtained by merely evaporating the hexane. Of the methods of recovery of the product which is 3-(4-bromophenylthio)acrylonitrile, the crystallization route is preferred for obtaining a product of the highest purity.

If instead of p-bromothiophenol in the method of Example 4 there is used instead an equal molar amount of p-iodothiophenol or p-fluorothiophenol there are recovered the corresponding 3-(4-iodophenylthio)acrylonitrile and 3-(4-fluorophenylthio)acrylonitrile, respectively.

Example 5

This is an example of the preparation of 3-(pentachlorophenylthio)acrylonitrile.

In a 2-liter flask is placed 575 g. (2.0 moles) of pentachlorothiophenol, and a solution of 80 g. (2 moles) of NaOH and 800 ml. of water is added while cooling the flask in an ice bath. Then over a period of two hours 247.5 g. (2 moles) of 2,3-dichloropropionitrile is added keeping the temperature at 15°–20° C. by cooling. The reaction mixture is stirred for 1 hour longer and then allowed to stand overnight. The desired product is preferably purified by recrystallization. Alternatively distillation under high vacuum can be used to purify the product. This intermediate product is 3-(pentachlorophenylthio)-2-chloropropionitrile.

This describes the dehydrochlorination of the intermediate product whose preparation is described in the paragraph immediately above. In a beaker there is placed 37.0 g. (0.1 mole) of 3-(pentachlorophenylthio)-2-chloropropionitrile prepared as described above. To the beaker is added 100 ml. of ether to dissolve or slurry the solid product therein, and 20.2 g. of triethylamine is added. This reaction mixture is heated on a steam bath and if any precipitate forms it is removed by filtration. After evaporating the ether on a steam bath, an additional 10 ml. of triethylamine is added to the filtrate, and after the precipitate forms with heating if necessary to facilitate precipitate formation, ether is added to dilute the slurry and make it more filterable. The slurry is filtered to remove the solid matter and again the ether is evaporated from the filtrate. This 10 ml. of triethylamine treatment with the following treatment steps is repeated four additional times to cause the substantial complete dehydrochlorination of the 3-(pentachlorophenylthio)-2-chloropropionitrile. Next the filtrate containing the dehydrochlorinated product is added to 500 ml. of hexane, and the mixture is heated to drive out the ether. To this hexane solution is added sodium sulfate and charcoal for decolorization, and the mixture is heated for a few minutes on the steam bath. The mixture is then filtered through "Supercel" to give a clear hexane solution of the product. Preferably, this hexane solution of the product is treated by crystallization techniques similar to that described in Example 1 to recover and purify in crystalline form the desired product which is 3-(pentachlorophenylthio)acrylonitrile. A crude product, of course, can be recovered merely by evaporating the hexane. Alternatively, this crude product, minus the hexane removed by evaporation, can be purified by distillation under high vacuum.

Example 6

This is an example of the preparation of 3-(4-chlorophenylthio)-2-methacrylonitrile.

In a 2-liter flask is placed 289 g. (2.0 moles) of p-chlorothiophenol, and a solution of 80 g. (2 moles) of NaOH in 800 ml. of water is added while cooling the flask in an ice bath. Then over a period of 2 hours 261.5 g. (2 moles) of 2-methyl-2,3-dichloropropionitrile (prepared by chlorination of methacrylonitrile) is added, keeping the temperature at 15°–20° C. by cooling. The reaction mixture is stirred for 1 hour longer and then allowed to stand overnight. The desired 3-(4-chlorophenylthio)-2-chloro - 2-methylpropionitrile intermediate product is then recovered by conventional crystallization and recrystallization technique of Example 1 or by distillation under high vacuum.

This describes the dehydrochlorination of the intermediate product whose preparation is described in the paragraph immediately above. In a beaker there is placed 24.5 g. (0.1 mole) of the 3 - (4-chlorophenylthio)-2-methyl-2-chloropropionitrile prepared as described above. To the beaker is added 100 ml. of ether to dissolve or slurry the solid product, and 20.2 g. of triethylamine is added. The mixture is heated on a steam bath and if precipitate forms it is removed by filtration. Heating on the steam bath is continued until all the ether is driven off. Then an additional 10 ml. of triethylamine is added causing the formation of a solid precipitate with heating on a steam bath if necessary to facilitate precipitate formation, and ether is added to dilute the resulting slurry. The slurry is then filtered to remove the solid matter, and the ether is again evaporated from the filtrate. The step of adding the 10 ml. of triethylamine, with heating if necessary, ether addition, filtration and evaporation of ether from the filtrate is repeated four additional times to ensure the substantially complete dehydrochlorination of the intermediate product. The filtrate from the last triethylamine treatment is poured into 500 ml. of hexane and the ether is driven off by heating. Then to the hexane solution is added sodium sulfate and charcoal for decolorization, and the mixture is heated for a few minutes on a steam bath. The mixture is then filtered through "Supercel" to give a clear hexane solution. The desired product, 3 - (4-chlorophenylthio)-2-methacrylonitrile, is then recovered and purified by the crystallization technique of Example 1 or by distillation under high vacuum.

The new products of the invention are especially useful as intermediates for the production of 3-(haloarylsulfinyl)alkenenitriles and 3-(haloarylsulfonyl)alkenenitriles, which sulfoxides and sulfones are very potent biological toxicants. The sulfones are described in copending application Serial No. 656,200, filed May 1, 1957. In making the sulfones from the products of the invention, i.e. the sulfides, the sulfides are merely subjected to controlled oxidation using, for example, $H_2O_2$ in acetic acid in a manner similar to that described in the copending sulfone application for oxidizing the arylthiohaloalkanenitriles to the corresponding arylsulfonylhaloalkanenitrile. Thus a new method for preparing the sulfones over that described in the copending sulfone application is provided. The preparation of the sulfoxides from the sulfides of the invention is described in detail in copending application Serial No. 706,239, filed December 31, 1957, now U.S. 3,000,927.

The new compounds of the invention are also active biological toxicants. For example, cis 3-(4-chlorophenylthio)acrylonitrile has shown insecticidal activity in test against the yellow fever mosquito larva giving 90% kill at 0.001% concentration of the chemical. This same cis-isomer has also proven to be an agricultural fungicide. In spore germination tests on the fungus Monilinia fructicola, excellent inhibition of spore germination was shown at concentrations as low as 0.01%. Additionally this cis-isomer has shown foliage protectant activity in test against cucumber leaf spot fungus showing promising activity at 0.125% of the chemical. Herbicidal activity has also been demonstrated using the cis-isomer both in contact and preemergent application at 0.5% and 25 lbs./acre, respectively, applications of the chemical. Further, it has been shown that this cis-isomer is an active microbiological toxicant in inhibiting the growth of both bacteria and fungus at concentrations lower than 0.001%. In the microbiological screening test, two types of bacteria and one type of fungus were used. The bacteria were *Micrococcus pyogenes* var. *aureus* and *Salmonella typhosa* and the fungus *Aspergillus niger*. The microbiological activity indicates the potential usefulness of the compounds of the invention as soap bacteriostats. For soap bacteriostat use, compounds containing more chlorine are more satisfactory, e.g., 3-(pentachlorophenylthio)acrylonitrile. The microbiological activity further indicates the usefulness of the compounds of the invention as paint preservatives.

The trans-isomer, i.e., trans 3-(4-chlorophenylthio)-acrylonitrile also showed biological toxicant activity. In tests even at concentrations as low as 0.0005%, 100% activity was demonstrated against yellow fever larva. Especially interesting in the preemergent herbicidal test was the specific activity against crabgrass which was demonstrated by this trans-isomer. The trans-isomer was also shown to have microbiological toxicant activity.

This application is a continuation-in-part of copending application S.N. 706,239, filed December 31, 1957, now U.S. 3,000,927.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A 3-(halophenylthio)alkenenitrile of the formula

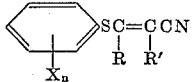

wherein R and R' are selected from the class consisting of hydrogen and hydrocarbon radicals free of aliphatic unsaturation and containing from 1 to 6 carbon atoms, provided that not more than one of R and R' are hydrocarbon radicals, X is a halogen atom and $n$ is an integer from 1 to 5.

2. The alkenenitrile of claim 1 wherein both R and R' are hydrogen.
3. The alkenenitrile of claim 2 wherein X is bromine.
4. The alkenenitrile of claim 2 wherein X is chlorine.
5. 3-(pentachlorophenylthio)acrylonitrile.
6. 3-(chlorophenylthio)acrylonitrile.
7. The 3 - (4 - chlorophenylthio)acrylonitrile isomer having a melting point of about 68–69° C.
8. The 3 - (4 - chlorophenylthio)acrylonitrile isomer having a melting point of about 101–102° C.

References Cited in the file of this patent

Buu-Hoi et al.: J. Org. Chem. 17 (1952), p. 352.